US009738299B2

United States Patent
Ard et al.

(10) Patent No.: US 9,738,299 B2
(45) Date of Patent: Aug. 22, 2017

(54) MOTHER DAUGHTER CART SYSTEM

(71) Applicant: Toyota Motor Engineering & Manufacturing North America, Inc., Erlanger, KY (US)

(72) Inventors: Shand Ard, Georgetown, KY (US); Rocky Leamer, Georgetown, KY (US); Patrick Behrens, Georgetown, KY (US); Daniel Blancett, Staffordsville, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/866,915

(22) Filed: Sep. 26, 2015

(65) Prior Publication Data
US 2017/0088156 A1  Mar. 30, 2017

(51) Int. Cl.
| | | |
|---|---|---|
| B62D 53/04 | (2006.01) | |
| B62D 63/08 | (2006.01) | |
| B62B 5/00 | (2006.01) | |
| B62B 3/02 | (2006.01) | |

(52) U.S. Cl.
CPC . *B62B 5/00* (2013.01); *B62B 3/02* (2013.01)

(58) Field of Classification Search
CPC .. B62B 3/02; B62B 5/00; B62D 53/04; B62D 63/08
USPC .......................................... 414/800; 280/411
See application file for complete search history.

(56) References Cited

U.S. PATENT DOCUMENTS

| | | | | |
|---|---|---|---|---|
| 2,649,992 A | * | 8/1953 | Bockius | B65G 1/07 312/306 |
| 3,511,548 A | * | 5/1970 | McIlhone | B65G 1/07 108/136 |
| 4,009,915 A | * | 3/1977 | Whitelaw | B65G 1/07 312/71 |

(Continued)

FOREIGN PATENT DOCUMENTS

| | | |
|---|---|---|
| EP | 2559606 B1 | 2/2013 |
| KR | 20040045154 A | 6/2004 |

OTHER PUBLICATIONS

Sara Pearson Spector, "Tuggers, carts work together to increase productivity and ergonomics", Modern Materials Handling, Mar. 1, 2014, retrieved from the Internet: <http://www.mmh.com/article/tuggers_carts_work_together_to_increase_productivity_and_ergonomics>, retrieved May 11, 2015, (5 pages).

*Primary Examiner* — Charles A Fox
*Assistant Examiner* — James Buckle, Jr.
(74) *Attorney, Agent, or Firm* — Christopher G. Darrow; Darrow Mustafa PC (57) ABSTRACT

A mother daughter cart system includes a transportable daughter cart, a moveable mother cart to which the daughter cart is selectively addable and an onboard energy generation system. With the addition of the daughter cart to the mother cart, the mother cart is coupled with the daughter cart for movement as a unit. The daughter cart includes a part support adapted to carry one or more parts, and an electrically powered actuator coupled to the part support and configured, when powered, to selectively impart movement to the part support to manipulate its placement. The energy generation system includes a generator configured to convert energy from the mother cart's movement into electrical energy usable to power the actuator in the daughter cart.

20 Claims, 6 Drawing Sheets

(56) References Cited

U.S. PATENT DOCUMENTS

| | | | |
|---|---|---|---|
| 5,542,500 A * | 8/1996 | Emrey | B62B 3/04 |
| | | | 187/244 |
| 7,374,197 B2 * | 5/2008 | Leverett | B60D 1/481 |
| | | | 280/408 |
| 7,481,440 B2 | 1/2009 | Weber et al. | |
| 2014/0008892 A1 * | 1/2014 | Holtan | B60D 1/02 |
| | | | 280/411.1 |
| 2015/0344086 A1 * | 12/2015 | Scarth | B62D 63/08 |
| | | | 280/411.1 |

* cited by examiner

MOTHER DAUGHTER CART SYSTEM

TECHNICAL FIELD

The embodiments disclosed herein generally relate to mother daughter cart systems.

BACKGROUND

So called mother daughter cart systems are sometimes used in assembly plants to deliver parts to an assembly area. Mother daughter cart systems typically include multiple transportable daughter carts for carrying parts, one or more moveable mother carts for transporting the daughter carts and tow vehicles for imparting movement to the mother carts.

In operation of these mother daughter cart systems, while one daughter cart, at an assembly area, is being unloaded of its parts, another daughter cart, at a loading area, is loaded with parts and added to a mother cart. The mother cart is moved by a tow vehicle from the loading area to the assembly area, transporting the loaded daughter cart with it. The loaded daughter cart is removed from the mother cart and left at the assembly area, while the unloaded daughter cart is added to either the same or another mother cart for return to the loading area.

SUMMARY

Disclosed herein are embodiments of mother daughter cart systems and methods of operating mother daughter cart systems. In one aspect, a mother daughter cart system includes a transportable daughter cart, a moveable mother cart to which the daughter cart is selectively addable and an onboard energy generation system. With the addition of the daughter cart to the mother cart, the mother cart is coupled with the daughter cart for movement as a unit. The daughter cart includes a part support adapted to carry one or more parts, and an electrically powered actuator coupled to the part support and configured, when powered, to selectively impart movement to the part support to manipulate its placement. The energy generation system includes a generator configured to convert energy from the mother cart's movement into electrical energy usable to power the actuator in the daughter cart.

In another aspect, a method of operating a mother daughter cart system includes imparting movement to a moveable mother cart and converting, with a generator, energy from the mother cart's movement into electrical energy. A transportable daughter cart is selectively addable to the mother cart and includes a part support adapted to carry one or more parts and an electrically powered actuator coupled to the part support. In the method, the electrical energy is used in the daughter cart to power the actuator to impart movement to the part support to manipulate its placement.

In yet another aspect, a mother daughter cart system includes a transportable daughter cart, a moveable mother cart to which the daughter cart is selectively addable and an onboard energy generation system. With the addition of the daughter cart to the mother cart, the mother cart is coupled with the daughter cart for movement as a unit. The daughter cart includes a frame including an upright portion and an electrically powered winch mounted to the upright portion of the frame and configured, when powered, to selectively wind and unwind. The daughter cart further includes a storage unit suspended by the winch. The storage unit includes at least one part support adapted to carry one or more parts, and is subject to having its elevation raised when the winch is powered to wind, and lowered when the winch is powered to unwind. The energy generation system includes a generator configured to convert energy from the mother cart's movement into electrical energy usable to power the winch in the daughter cart to selectively wind and unwind.

These and other aspects will be described in additional detail below.

BRIEF DESCRIPTION OF THE DRAWINGS

The various features, advantages and other uses of the present embodiments will become more apparent by referring to the following detailed description and drawings in which.

DETAILED DESCRIPTION

This disclosure teaches a mother daughter cart system. In order, for example, to facilitate loading and unloading operations, energy from the mother cart's movement is converted into electrical energy that is then used to operate the daughter cart to selectively manipulate the placement of its part supports.

Figure 1:
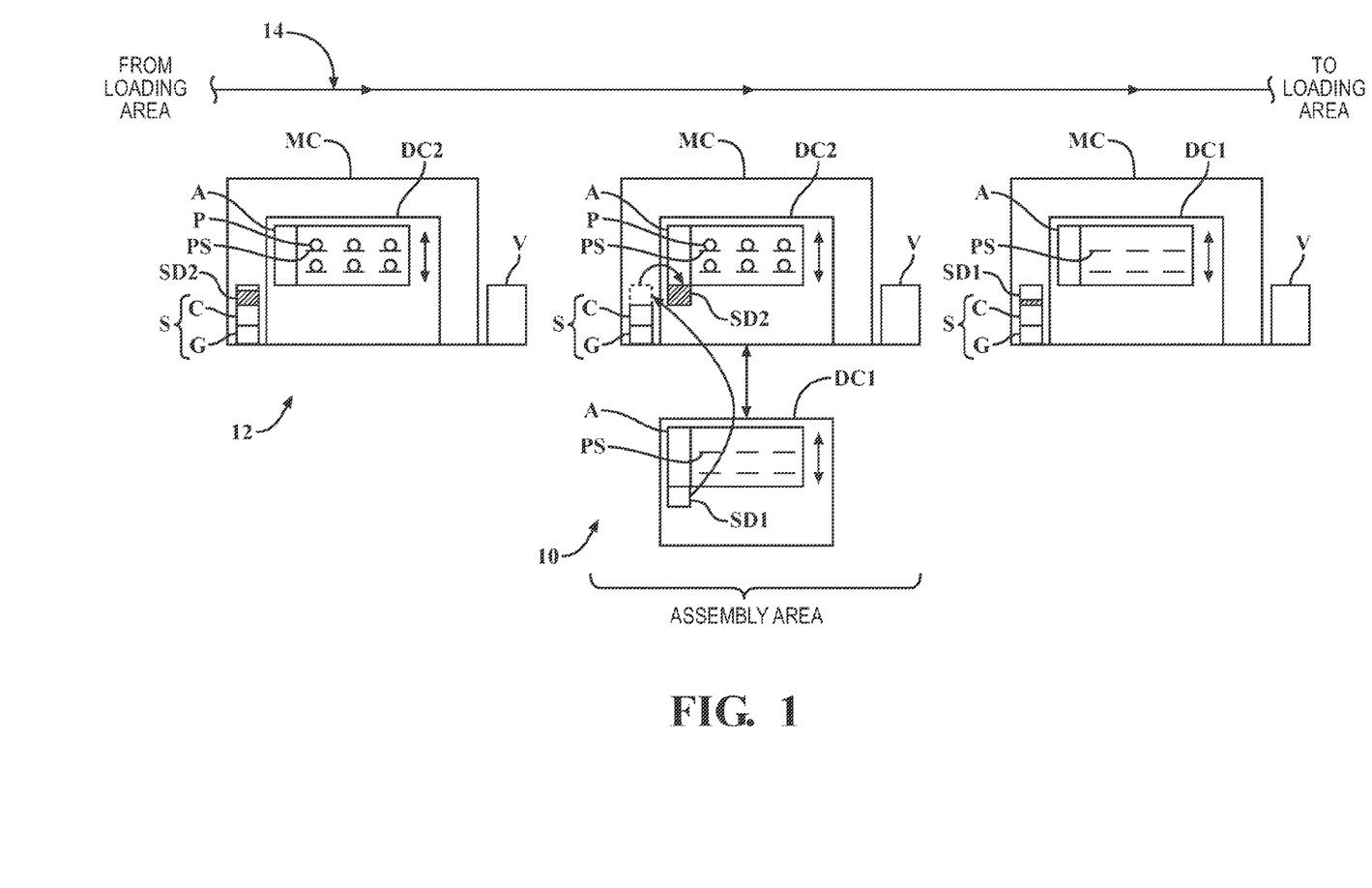
FIG. 1 is a schematic representation of an assembly plant and a mother daughter cart system, as well as the operation of the mother daughter cart system, showing the mother daughter cart system including a mother cart with an energy generation system for converting energy from the mother cart's movement into electrical energy and daughter carts with part supports and actuators coupled to the part supports, which are powered using the electrical energy to selectively manipulate the placement of the part supports.

An example of an assembly plant 10 is represented schematically in FIG. 1. As shown, the assembly plant 10 includes an assembly area and a loading area. The assembly area can be adapted for supporting the assembly of products, such as vehicles, for example, in the assembly plant 10, and the loading area can include parts P configured for assembly into the products at the assembly area. The parts P can be individual components, collections of similar or different components, sub-assemblies or any other constituent portions of the products. The assembly area may individually support the complete assembly of the products, for example, or be one of multiple assembly areas collectively adapted to support the progressive assembly of the products.

A mother daughter cart system 12 used in the assembly plant 10 to deliver the parts P from the loading area to the assembly area is also represented schematically in FIG. 1.

In general, the mother daughter cart system 12 may include one or more transportable daughter carts DC for carrying the parts P, one or more moveable mother carts MC for transporting the daughter carts DC and one or more tow vehicles V for imparting movement to the mother carts MC along a path of travel 14 in the assembly plant 10. The mother carts MC may accommodate one daughter cart DC, as generally shown, or one, some or all of the mother carts MC could accommodate multiple daughter carts DC.

In the mother daughter cart system 12, some or all of the mother carts MC may be arranged in one or more chains of mother carts MC in which, for instance, multiple mother carts MC are aligned and coupled end to end. Each mother cart MC, or chain of mother carts MC, as the case may be, may be coupled to a tow vehicle V. For a single mother cart MC, a tow vehicle V may be coupled at the head of the mother cart MC to impart movement to the mother cart MC by pulling it, as generally shown in FIG. 1, or at the tail of the mother cart MC to impart movement to the mother cart MC by pushing it. Similarly, for a chain of mother carts MC, a tow vehicle V may be coupled at the head of the chain of mother carts MC to impart movement to the chain of mother carts MC by pulling it, or at the tail of the chain of mother carts MC to impart movement to the chain of mother carts MC by pushing it. Alternatively, or additionally, a single mother cart MC, or one, some or all of the mother carts MC in a chain of mother carts MC could be self-propelled to impart movement to the single mother cart MC or the chain of mother carts MC, as the case may be.

According to the foregoing general description of the mother daughter cart system 12, this disclosure is applicable to mother daughter cart systems 12 including a single mother cart MC or multiple mother carts MC arranged singularly, as one or more chains of mother carts MC or both, including mother carts MC that accommodate one or multiple daughter carts DC, as well as any number of daughter carts DC and tow vehicles V. However, for simplicity and ease of understanding, for purposes of the remainder of this description the mother daughter cart system 12 is represented, as shown in FIG. 1, by two transportable daughter carts DC1 and DC2 for carrying the parts P (referred to collectively as daughter carts DC except where differentiated to facilitate discussion), a moveable mother cart MC for transporting the daughter carts DC, which may accommodate one or the other of the daughter carts DC1 and DC2 at a given time, and a tow vehicle V for imparting movement to the mother cart MC.

Each daughter cart DC is transportable and includes one or more part supports PS that are each adapted to carry one or more of the parts P. Each of the part supports PS can be, or include, a shelf, a bin, a holder or other structure adapted to carry one or more of the parts P, for example. A given part support PS can be generically shaped and sized to carry a variety of different parts P, for example, or specially shaped and sized to carry an individual specific part P or multiple specific parts P.

Each daughter cart DC, by its one or more part supports PS, is subject to being either loaded with one or more parts P or unloaded of one or more of its parts P. To load a daughter cart DC with one or more parts P, the parts P are collectively loaded to one, some or all of the part supports PS which, when loaded, carry their respective parts P. Conversely, to unload a daughter cart DC of one or more of its parts P, the parts P are unloaded from their respective part supports PS.

The mother cart MC is moveable, as noted above, and generally configured to transport the daughter carts DC. The mother cart MC and the daughter carts DC are collaboratively configured for both the selective addition of a daughter cart DC to the mother cart MC and the selective removal of a daughter cart DC from the mother cart MC. In general, with the addition of a daughter cart DC to the mother cart MC, the mother cart MC is coupled with the daughter cart DC for movement as a unit. The mother cart MC may be coupled with the daughter cart DC by a mechanical coupling implemented in whole or in part by gravity, engagement by the mother cart MC against the daughter cart DC in the direction or directions of the movement of the mother cart MC or any combination of these. Beyond this coupling, the mother cart MC may, for instance, be locked to the daughter cart DC with the addition of the daughter cart DC to the mother cart MC. With the removal of a daughter cart DC from the mother cart MC, the mother cart MC is uncoupled from the daughter cart DC for movement individually from the daughter cart DC.

Figure 2:
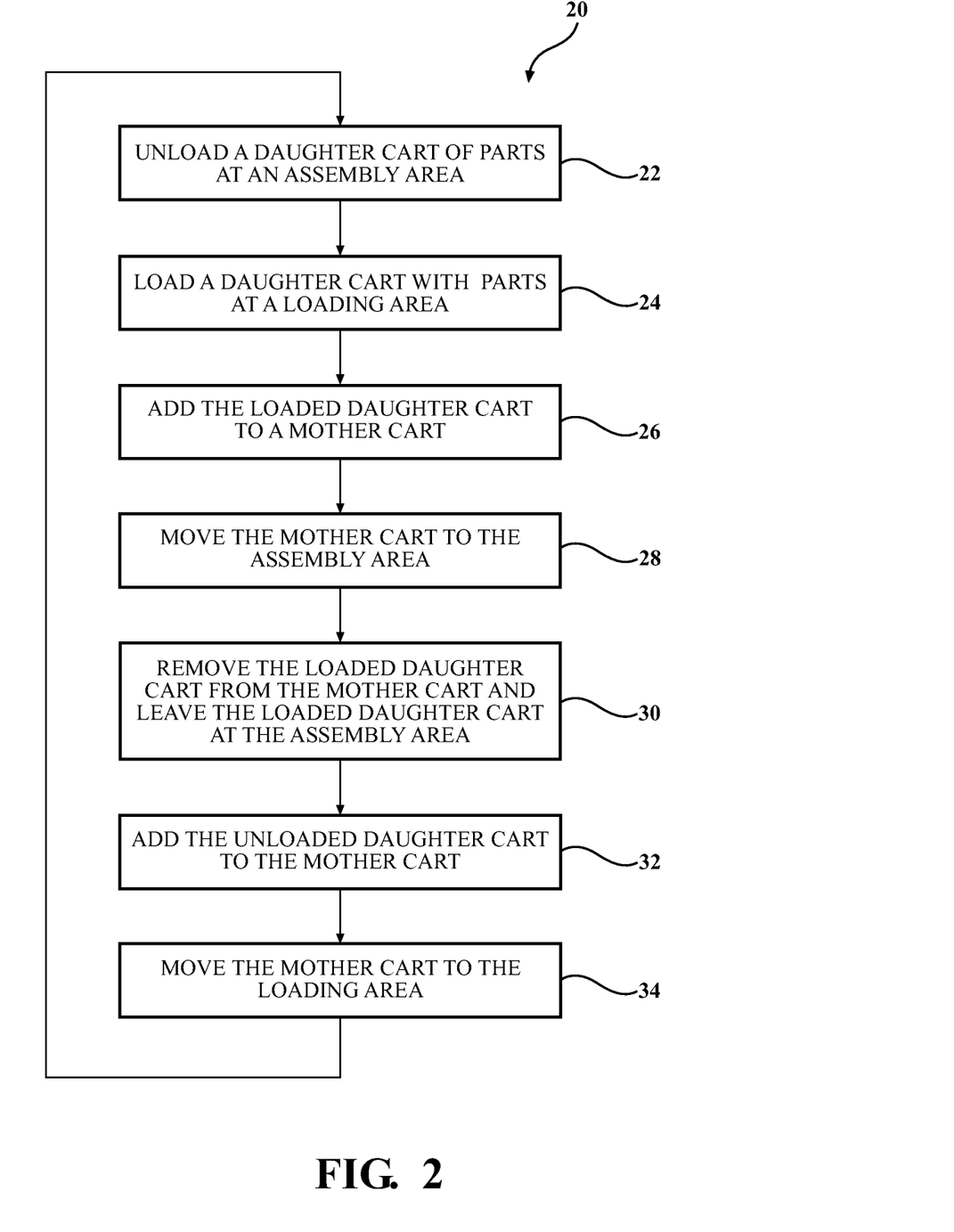
FIGS. 2 and 3 are flow diagrams depicting the operation of the mother daughter cart system represented in FIG. 1.

As represented in FIG. 1, in the assembly plant 10, the mother daughter cart system 12, in operation, delivers the parts P that are assembled into products at the assembly area to the assembly area from the loading area. The operations of an example process 20 for delivering the parts P to the assembly area from the loading area are shown in FIG. 2.

Initially, in operation 22, the daughter cart DC1, previously loaded with parts P and left at the assembly area, is unloaded of its parts P, which are assembled into products at the assembly area.

Preferably before the daughter cart DC1 is completely unloaded of its parts P, the other daughter cart DC2 is loaded with parts P at the loading area in operation 24, and added to the mother cart MC in operation 26. With the addition of the loaded daughter cart DC2 to the mother cart MC in operation 26, the mother cart MC is coupled with the loaded daughter cart DC2 for movement as a unit. In operation 28, the mother cart MC is towed by the tow vehicle V or otherwise propelled for movement along the path of travel 14 from the loading area to the assembly area. Since the loaded daughter cart DC2 is added to the mother cart MC, with this movement of the mother cart MC, the loaded daughter cart DC2 is transported with its parts P to the assembly area by the mother cart MC.

In operation 30, following the transportation of the loaded daughter cart DC2 to the assembly area by the mother cart MC, the loaded daughter cart DC2 is removed from the mother cart MC. With the removal of the loaded daughter cart DC2 from the mother cart MC, the mother cart MC is uncoupled from the loaded daughter cart DC2 for movement individually from the loaded daughter cart DC2 along the path of travel 14 from the assembly area back to the loading area. The loaded daughter cart DC2, on the other hand, is left at the assembly area, where it is unloaded of its parts P according to operation 22 in a repeat cycle of the process 20.

In operation 32, the unloaded daughter cart DC1 is added to the mother cart MC. Similarly to the addition of the loaded daughter cart DC2 to the mother cart MC in operation 26, with the addition of the unloaded daughter cart DC1 to the mother cart MC, the mother cart MC is coupled with the unloaded daughter cart DC1 for movement as a unit. In operation 34, the mother cart MC is towed by the tow vehicle V or otherwise propelled for movement along the path of travel 14 from the assembly area to the loading area. Since the unloaded daughter cart DC1 is added to the mother cart MC, with this movement of the mother cart MC, the unloaded daughter cart DC1 is transported to the loading area by the mother cart MC, where it is loaded with parts P according to operation 24 in a repeat cycle of the process 20.

It will be understood that, in the assembly plant 10, the loading area, the assembly area or both may be occupied by one or more operators tasked with, in the case of the loading area, loading an unloaded daughter cart DC with parts P, and in the case of the assembly area, unloading a loaded daughter cart DC of it parts P.

In the assembly plant 10, the loading and unloading operations may be subject to a variety of constraints. For instance, the loading and unloading operations may be subject to human factors constraints calling for the ergonomic placement of all of the part supports PS in the daughter carts DC. These human factors constraints may however compete, for example, with efficiency constraints calling for including increasing numbers of part supports PS in the daughter carts DC for carrying increasing numbers of parts P, as well as constraints flowing from the assembly plant 10 itself, such as differences in elevation between the loading area and the assembly area with respect to the path of travel 14 along which the mother cart MC moves.

As described in additional detail below, in the mother daughter cart system 12, the daughter carts DC are operable to selectively manipulate the placement of their part supports PS. Further, onboard systems are used to convert energy from the movement of the mother cart MC into electrical energy that is then used to operate the daughter carts DC to selectively manipulate the placement of their part supports PS. This not only facilitates the loading and unloading operations generally, but can also accommodate the above described and other constraints on the loading and unloading operations, while reducing or eliminating the competition between them.

In order to configure the daughter carts DC in the mother daughter cart system 12 for operation to selectively manipulate the placement of their part supports PS, one, some of all of the part supports PS in each daughter cart DC are coupled to the remainder of the daughter cart DC for relative movement. This subjects the placement of the part supports PS to selective manipulation relative to the remainder of the daughter cart DC.

The coupling between the part supports PS in each daughter cart DC and the remainder of the daughter cart DC may be permissive of the manipulation of the positions, the orientations or both of the part supports PS. As generally indicated in FIG. 1, the coupling may be permissive of the elevation of the supports PS being raised or lowered, for example. Alternatively, or additionally, the coupling may be permissive of side to side movement, rotation or other manipulations of the placement of the part supports PS.

As represented in FIG. 1, each daughter cart DC further includes an actuator A coupled between the part supports PS and the remainder of the daughter cart DC. The actuator A can be any component or combination of components configured to selectively impart any manner of movement to the part supports PS permitted by their coupling to the remainder of the daughter cart DC in order to manipulate their placement. The actuator A may impart movement to all of the part supports PS as a group, to any subgroup of the part supports PS or to any of the part supports PS individually, for example.

In accordance with the coupling between the part supports PS in each daughter cart DC and the remainder of the daughter cart DC, the actuator A may selectively impart movement to the part supports PS in order to manipulate their position, orientation or both. As generally indicated in FIG. 1, the actuator A may selectively impart movement to the part supports PS in order to raise or lower their elevation, for example. Alternatively, or additionally, the actuator A could selectively impart movement to the part supports PS in order to move them side to side, to rotate them or otherwise manipulate their placement.

In the mother daughter cart system 12, in support of the operation of the daughter carts DC to selectively manipulate the placement of their part supports PS, and more specifically, the powering of the actuator A in each daughter cart DC to selectively impart movement to the part supports PS in order to manipulate their placement, the actuator A is electrically powered, and the mother daughter cart system 12 includes an onboard energy generation system S configured to convert energy from the movement of the mother cart MC into electrical energy, and to support the use of this electrical energy to power the actuator A.

As noted above, in the delivery of the parts P from the loading area to the assembly area in the assembly plant 10 by the mother daughter cart system 12, the mother cart MC is towed by the tow vehicle V or otherwise propelled for movement along the path of travel 14 from the loading area to the assembly area.

As a product of its movement along the path of travel 14, the mother cart MC generally gathers energy. This energy can be kinetic energy, for example, taking the form of sound energy, mechanical energy represented in the movement of the mother cart MC as a whole, mechanical energy represented in the movement of the components of the mother cart MC relative to the mother cart MC as a whole or other forms of kinetic energy. Similarly, when they are added to the mother cart MC, each daughter cart DC generally gathers energy as it is transported by the mother cart MC, which can likewise be kinetic energy, for example, taking the form of sound energy, mechanical energy represented in the movement of the daughter cart DC as a whole, mechanical energy represented in the movement of the components of the daughter cart DC relative to the daughter cart DC as a whole or other forms of kinetic energy.

In the mother daughter cart system 12 represented in FIG. 1, the energy generation system S includes a generator G that generates electrical energy by converting portions of the energy gathered by the mother cart MC, the daughter carts DC or both as a product of the movement of the mother cart MC along the path of travel 14 into electrical energy. The generator G may, accordingly, be included onboard the mother cart MC or onboard the daughter carts DC, or distributed between any combination of the mother cart MC and the daughter carts DC. As shown, the generator G is included onboard the mother cart MC. Including the generator G onboard the mother cart MC may, for instance, take advantage of the mother cart MC experiencing more movement along the path of travel 14 than any individual daughter cart DC in the operation of the mother daughter cart system 12.

The energy generation system S is further generally configured to support the use of the electrical energy generated by the generator G to power the actuator A in each daughter cart DC to selectively impart movement to the part supports PS in order to manipulate their placement.

In cases of strictly concurrent generation and use of this electrical energy to power the actuator A in each daughter cart DC, the energy generation system S could, for example, be electrically connected to the actuator A. In these cases, with the generator G included onboard the mother cart MC, the energy generation system S could, for example, include the first of two ends of a terminal connection between the energy generation system S and the actuator A, and the other of the two ends of the terminal connection could be included in the daughter cart DC, with the terminal connection configured for being made manually or automatically with the addition of the daughter cart DC to the mother cart MC, for instance.

As generally indicated in FIG. 1, in cases of non-concurrent generation of electrical energy by the generator G and use of this electrical energy to power the actuator A in each daughter cart DC, the energy generation system S may further include a charger C electrically connected to the generator G that uses the electrical energy to charge rechargeable storage devices SD1 and SD2 (referred to collectively as storage devices SD except where differentiated to facilitate discussion) that, when charged and connected to the actuator A, can power the actuator A. The storage devices SD may each be, or include, one or more batteries or one or more capacitors, for instance. The charger C may include a charging circuit configured to convey the electrical energy to the storage devices SD, either directly or after conditioning the electrical energy for receipt by the storage devices SD. Optionally, the charging circuit may further be configured control various aspects of the charging operation in order, for example, to prevent the storage devices SD from overcharging.

The charger C may, for example as shown, be included in the energy generation system S onboard the same mother cart MC or daughter cart DC, as the case may be, as the generator G. Accordingly, as shown, the charger C can be included in the energy generation system S with the generator G onboard the mother cart MC. In this or other examples of the energy generation system S where the charger C is included onboard the mother cart MC, the storage devices SD may be selectively connectable to either the charger C when discharged, or to the actuator A when charged. Otherwise, if the charger C is, for example, included onboard the daughter cart DC, the storage devices SD may but need not be selectively connectable to either the charger C when discharged, or to the actuator A when charged.

Figure 3:
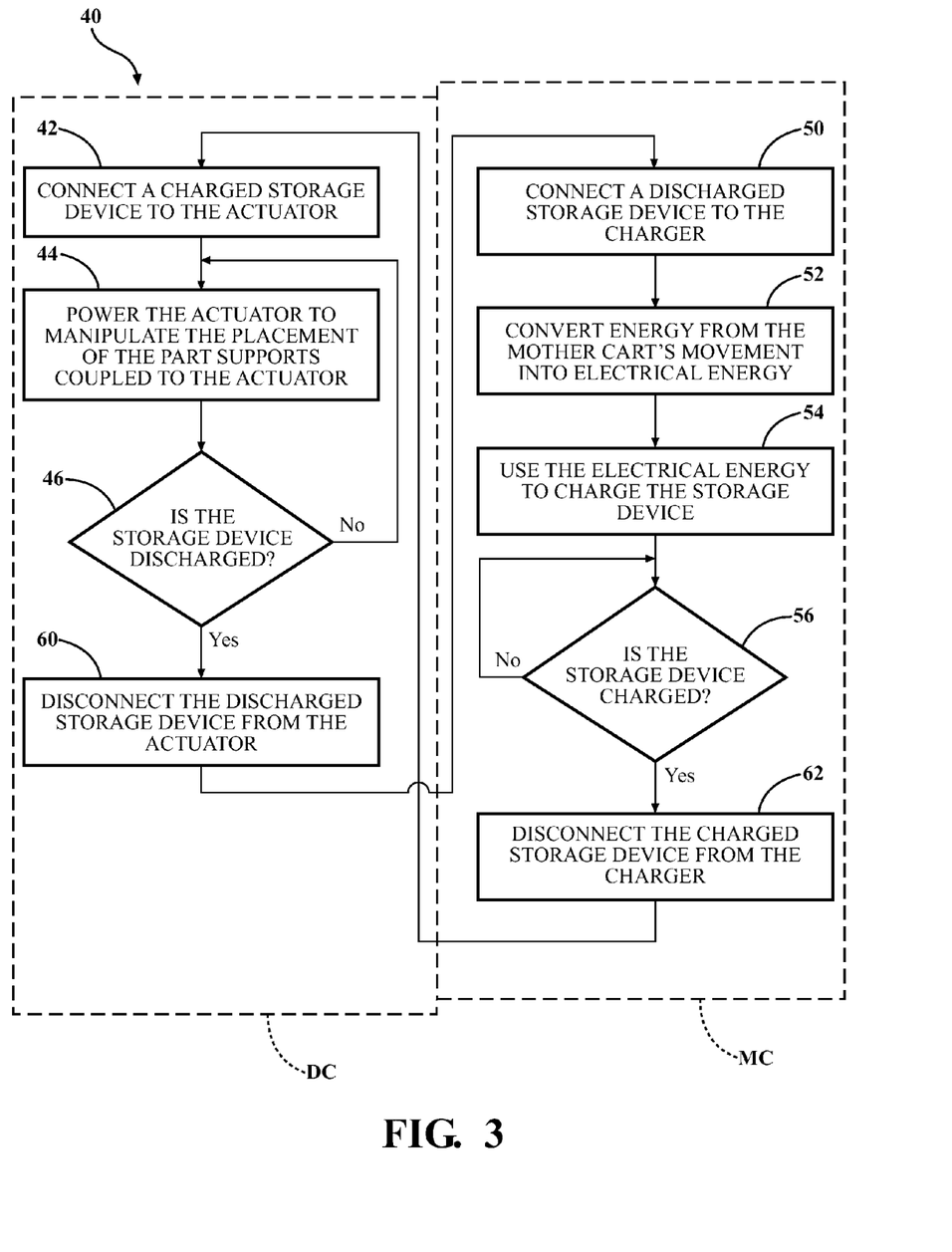

As represented in FIG. 1, in the assembly plant 10, the mother daughter cart system 12, in operation, converts portions of the energy gathered by the mother cart MC as a product of its movement into electrical energy using the generator G, and uses the electrical energy to power the actuator A in each daughter cart DC by using the charger C to charge rechargeable storage devices SD that can then be connected to the actuator A to power the actuator A. The operations of an example process 40 for this operation of the mother daughter cart system 12 are shown in FIG. 3.

For purposes of discussion, the operations of the example process 40 are described in the context of the operations shown in FIG. 2 and represented in FIG. 1 of the example process 20 for delivering the parts P to the assembly area from the loading area. It will be understood that, although the operations of the example process 40 are applicable to the context of the operations of the example process 20 shown in FIG. 2 and represented in FIG. 1, they are not limited to this context.

Initially, in operation 42, at the daughter cart DC1 previously loaded with parts P and left at the assembly area, a previously charged storage device SD1 is connected to the actuator A in the daughter cart DC1. In operation 44, in order to facilitate the daughter cart DC1 being unloaded of its parts P, the actuator A is powered by the storage device SD1 to selectively impart movement to the part supports PS in order to manipulate their placement. According to operation 46, the actuator A may continue, according to operation 44, to be powered by the storage device SD1 until the storage device SD1 is discharged.

Meanwhile, in operation 50, at the mother cart MC to which the daughter cart DC2 is added, a previously discharged storage device SD2 is connected to the charger C included in the energy generation system S onboard the mother cart MC. In operation 52, as the mother cart MC is towed by the tow vehicle V or otherwise propelled for movement along the path of travel 14, either from the assembly area to the loading area or from the loading area to the assembly area, or both, the generator G included in the energy generation system S onboard the mother cart MC converts portions of the energy gathered by the mother cart MC as a product of this movement into electrical energy. In operation 54, the charger C uses the electrical energy generated by the generator G to charge the storage device SD2 until, according to operation 56, the storage device SD2 is charged.

With the discharge of the storage device SD1 according to operation 46, in operation 60, at the unloaded daughter cart DC1, the discharged storage device SD1 is disconnected from the actuator A and connected to the charger C included in the energy generation system S onboard the mother cart MC according to operation 50 in a repeat cycle of the process 40. Similarly, with the charging of the storage device SD2 according to operation 56, in operation 62, at the mother cart MC, the charged storage device SD2 is disconnected from the charger C and connected to the actuator A in the daughter cart DC2 according to operation 42 in a repeat cycle of the process 40.

It will be understood that both the spatial and temporal aspects of the operations of the example process 40 may vary from their representation in FIG. 1.

According to operation 44, for instance, instead of powering the actuator A in a loaded daughter cart DC left at the assembly area in order to facilitate the daughter cart DC being unloaded of its parts P, the actuator A in an unloaded daughter cart DC left at the loading area could be powered in order to facilitate the daughter cart DC being loaded with parts P. Alternatively, or additionally, the actuator A in a loaded daughter cart DC added to the mother cart MC could be powered as the loaded daughter cart DC is transported with its parts P to the assembly area by the mother cart MC in order to facilitate the daughter cart DC being unloaded of its parts P when it is subsequently left at the assembly area, or, the actuator A in an unloaded daughter cart DC added to the mother cart MC could be powered as the unloaded daughter cart DC is transported to the loading area by the mother cart MC in order to facilitate the daughter cart DC being loaded with parts P when it is subsequently left at the loading area.

Moreover, according to operations 60 and 62 and operations 50 and 42 in a repeat cycle of the process 40, for instance, instead of effecting a swap of a discharged storage device SD for a charged storage device SD among the daughter carts DC and the charger C included in the energy generation system S onboard the mother cart MC, a discharged storage device SD, after being disconnected from an actuator A in a daughter cart DC according to operation 60, could be added to an inventory of discharged storage devices SD and later connected to the charger C included in the energy generation system S onboard the mother cart MC according to operation 50 in a repeat cycle of the process 40, or, a charged storage device SD, after being disconnected from the charger C included in the energy generation system S onboard the mother cart MC according to operation 62, could be added to an inventory of charged storage devices SD and later connected to an actuator A in a daughter cart DC according to operation 42 in a repeat cycle of the process 40.

Figure 4:
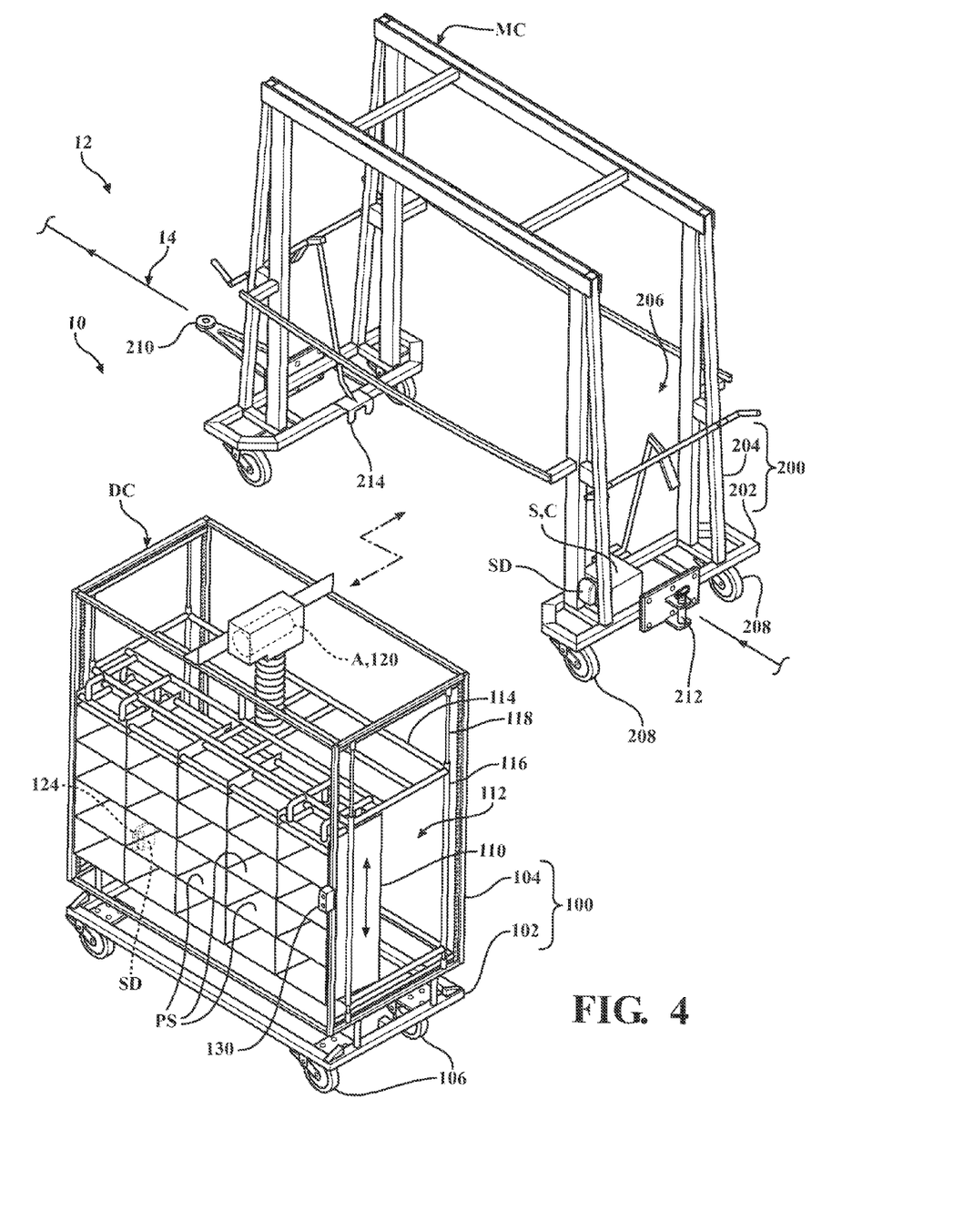
FIG. 4 is a perspective view of an example mother daughter cart system according to FIGS. 1-3, showing, in the mother cart, an example of an energy generation system, and in the daughter cart, an example of part supports and an example of an actuator coupled to the part supports.

Non-limiting examples of a mother cart MC and a daughter cart DC for the mother daughter cart system 12 represented in FIG. 1 are shown in FIG. 4.

As shown, the daughter cart DC may include a rigid frame 100 including a base portion 102 and an upright portion 104 extending from the base portion 102. The base portion 102 of the frame 100 is a generally open structure constructed from rigidly interconnected rails that collectively form a horizontal platform for the remainder of the daughter cart DC. As shown, the daughter cart DC may include casters 106 mounted at the underside of the base portion 102 to support the daughter cart DC as a whole for movement individually from the mother cart MC. The casters 106 may be rigid casters, for example, although one, some or all of the casters 106 could alternatively be swivel casters. Where the base portion 102 has, as shown, a generally rectangular footprint, the daughter cart DC can include a caster 106 mounted at each corner of the base portion 102 of the frame 100.

The upright portion 104 of the frame 100 is a generally open structure constructed from rigidly interconnected rails that collectively provide support for a storage unit 110 and define an interior space 112 for accommodating the storage unit 110. As shown, the storage unit 110 includes a number of part supports PS. In the storage unit 110, each of the part supports PS is generally structured as a horizontal shelf and adapted for carrying one or more parts P, and is arranged as a part of an array of part supports PS.

In order to configure the daughter cart DC for operation to selectively manipulate the placement of its supports PS, the storage unit 110, and therefore its part supports PS, are coupled to the remainder of the daughter cart DC for relative movement in order to subject the placement of the part supports PS to selective manipulation relative to the remainder of the daughter cart DC. As generally shown, the coupling between the storage unit 110 and the remainder of the daughter cart DC is permissive of the elevation of the storage unit 110 being raised or lowered. More specifically, the storage unit 110 includes an overhead frame 114 including upright linear bushings 116 that ride over respective upright guide rods 118 included in the upright portion 104 of the frame 100. Where the overhead frame 114 has, as shown, a generally rectangular footprint, it may include an upright linear bushing 116 at each corner of the overhead frame 114, and the upright portion 104 of the frame 100 can include respective correspondingly located upright guide rods 118.

Figure 5:
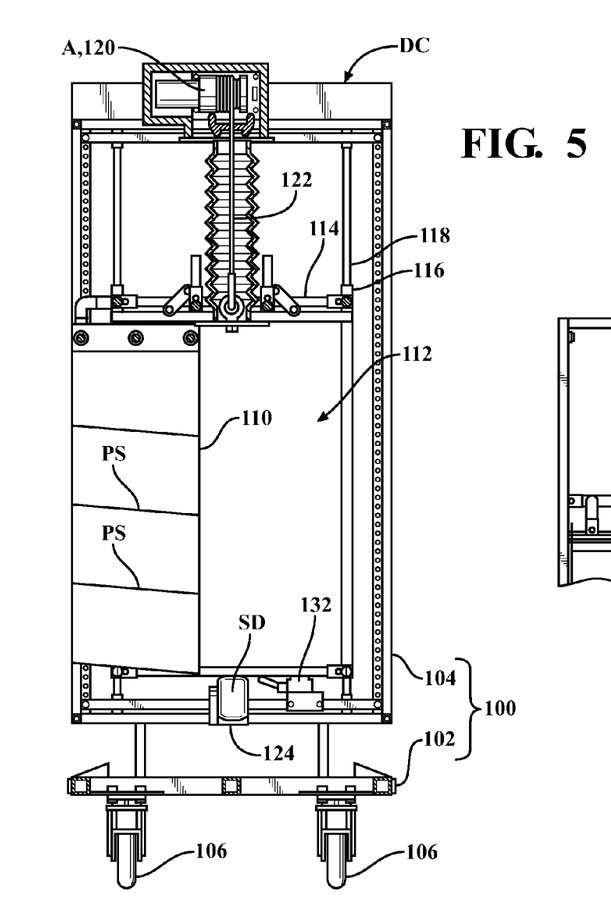
FIG. 5 is a cross section of the daughter cart taken along the line 5-5 in FIG. 4, showing aspects of the part supports and the actuator coupled to the part supports.
Figure 6:
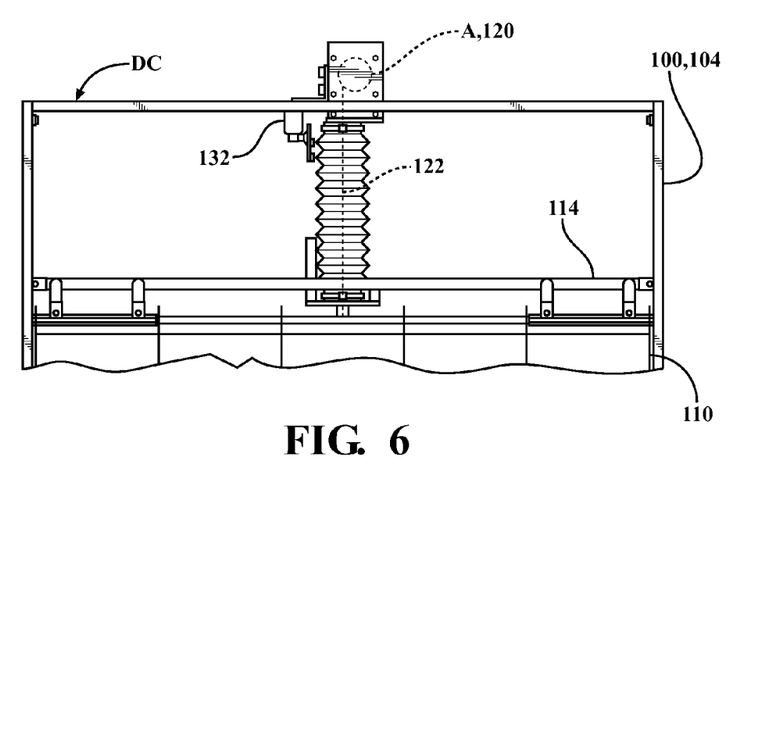
FIG. 6 is a partial side view of the daughter cart of FIG. 4, showing aspects of the part supports and the actuator coupled to the part supports.

As shown with additional reference to FIGS. 5 and 6, the actuator A in the daughter cart DC is implemented with an electrically powered winch 120. The winch 120 is mounted to the upright portion 104 of the frame 100, overhead the storage unit 110, and is connected to the overhead frame 114 of the storage unit 110 by a winch cable 122. In this arrangement, the winch 120 generally suspends the storage unit 110 from the upright portion 104 of the frame 100 by the winch cable 122. The winch 120, in operation, winds the winch cable 122 to impart upward movement to the overhead frame 114 and the remainder of the storage unit 110 in order to raise the elevation of the storage unit 110, and therefore its part supports PS, and unwinds the winch cable 122 to impart downward movement to the overhead frame 114 and the remainder of the storage unit 110 in order to lower the elevation of the storage unit 110, and therefore its part supports PS.

The daughter cart DC includes a mounting base 124 electrically connected to the winch 120 to which a storage device SD, when charged, can be selectively connected in order to selectively connect the storage device SD to the winch 120 for powering the winch 120. The daughter cart DC may further include a switch 130 electrically connected between the mounting base 124 and the winch 120, and therefore between the storage device SD and the winch 120, to allow an operator to selectively operate the winch 120 to wind or unwind the winch cable 122 in order to, for example, ergonomically place the part supports PS of the storage unit 110 in the daughter cart DC. As shown, the daughter cart DC may also include limit switches 132 electrically connected between the mounting base 124 and the winch 120, and therefore between the storage device SD and the winch 120, to prohibit the storage unit 110 from over traveling in its upward or downward movement by cutting power to the winch 120.

As shown, the mother cart MC may include a rigid frame 200 including a divided base portion 202 and an upright portion 204 extending from the base portion 202. Each part of the divided base portion 202 of the frame 200 is a generally open structure constructed from rigidly interconnected rails that collectively form part of a horizontal platform for the remainder of the mother cart MC. The upright portion 204 of the frame 200 is a generally open structure constructed from rigidly interconnected rails that collectively span the parts of the divided base portion 202 and define an interior space 206 for accommodating the daughter cart DC. As shown, the mother cart MC may include casters 208 mounted at the underside of the base portion 202 to support the mother cart MC as a whole for movement. The casters 208 may be rigid casters, for example, although one, some or all of the casters 208 could alternatively be swivel casters. Where the base portion 202 has, as shown, a generally rectangular footprint, the mother cart MC can include a caster 208 mounted at each corner of the base portion 202 of the frame 200.

The mother cart MC may include a hitch bar 212 at its head and a corresponding removable hitch pin 210 at its tail in order, for example, to support the arrangement of the mother cart MC in a chain of mother carts MC or to support the coupling of the mother cart MC to a tow vehicle V.

As shown, the daughter cart DC can be selectively added to or removed from the mother cart MC by placing the daughter cart DC into or out of, as the case may be, the interior space 206 defined by the upright portion 204 of the frame 200 of the mother cart MC. In general, with the addition of a daughter cart DC to the mother cart MC, the mother cart MC is coupled with the daughter cart DC for movement as a unit. The mother cart MC may, as shown, be coupled with the daughter cart DC by a mechanical coupling implemented in whole or in part by the engagement of the parts of the divided base portion 202 of the frame 200 of the mother cart MC against the base portion 102 of the frame 100 of the daughter cart DC. Beyond this coupling, the mother cart MC may, for instance, include lock bars 214 at each part of the divided base portion 202 of its frame 200 that selectively rotate over rails forming the base portion 102 of the frame 100 of the daughter cart DC to lock the daughter cart DC to the mother cart MC.

Figure 7:
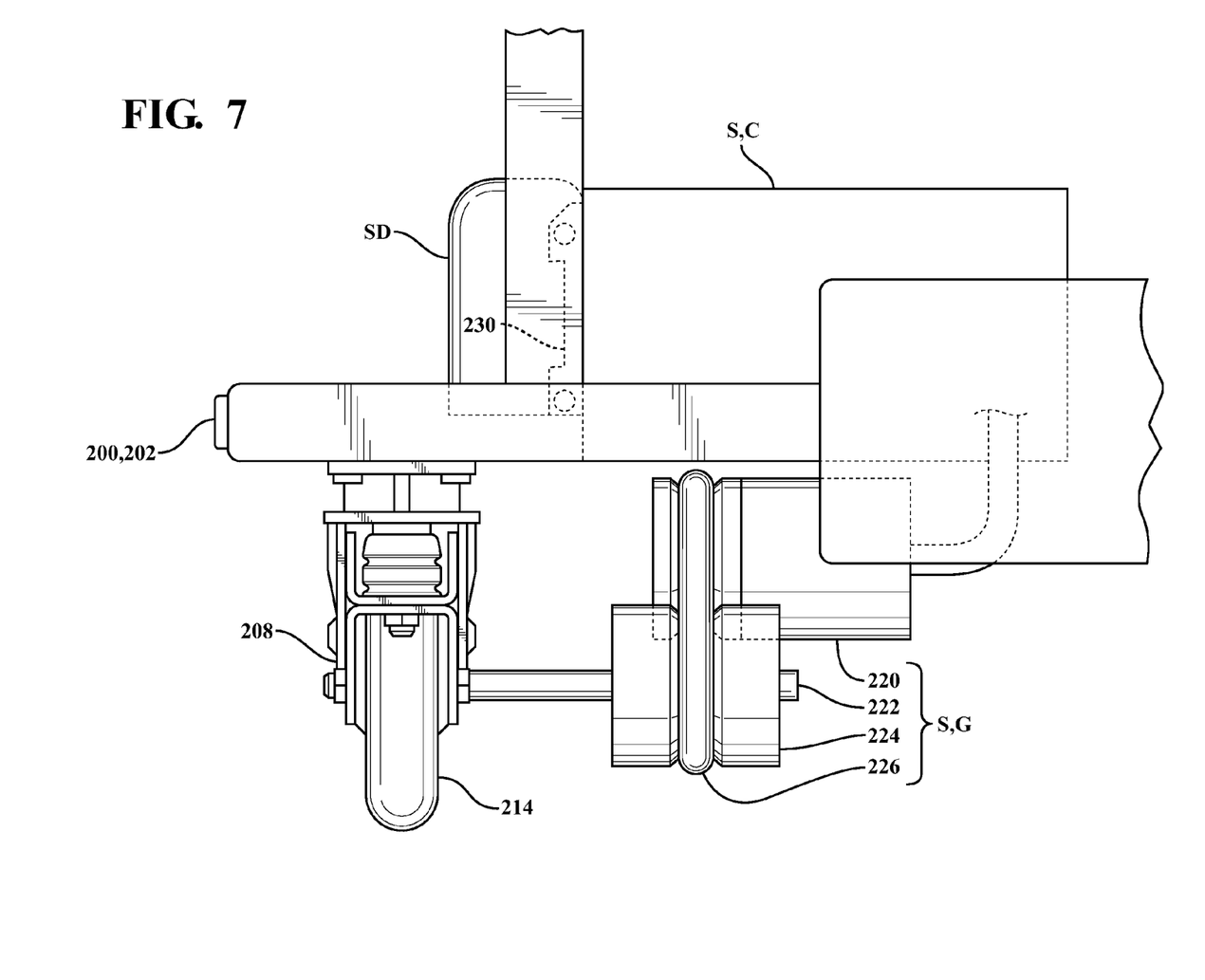
FIG. 7 is a partial side view of the mother cart of FIG. 4, showing aspects of the energy generation system.

As shown with additional reference to FIG. 7, the energy generation system S onboard the mother cart MC includes a generator G that generates electrical energy by converting portions of the energy gathered by the mother cart MC as a product of its movement along the path of travel 14 into electrical energy, and a charger C electrically connected to the generator G that uses the electrical energy to charge rechargeable storage devices SD.

As a product of its movement along the path of travel 14, the mother cart MC gathers kinetic energy in the form, among others, of mechanical energy represented in the movement of the components of the mother cart MC relative to the mother cart MC as a whole. For instance, as product of the movement of the mother cart MC along the path of travel 14, in a caster 208 mounted at the underside of the base portion 202 of its frame 200, a wheel 214 is rotated against the ground.

In the implemented energy generation system S, the generator G converts the rotational motion of the wheel 214 in the caster 208 into electrical energy. As shown, the generator G includes an electric motor 220 to which the rotational motion of the wheel 214 is applied in order to drive the electric motor 220 and, therefore, cause the electric motor 220 to generate electrical energy. The rotational motion of the wheel 214 may be applied to the electric motor 220, for example, by an axle 222 for the wheel 214 fixed to the wheel 214 for common rotation, a drive sheave 224 supported by the axle 222 and a drive belt 226 connected between the drive sheave 224 and the electric motor 220.

As shown, the charger C is electrically connected to the electric motor 220 in the generator G that uses the electrical energy generated by the electric motor 220 to charge a storage device SD. The charger C may include a base 230 electrically connected to its internal charging circuit to which a storage device SD, when discharged, can be selectively connected in order to convey the electrical energy generated by the electric motor 220 to the storage device SD.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A mother daughter cart system, comprising:
   a transportable daughter cart, the daughter cart including a part support adapted to carry one or more parts, and an electrically powered actuator coupled to the part support and configured, when powered, to selectively impart movement to the part support to manipulate its placement;
   a moveable mother cart to which the daughter cart is selectively addable, wherein with the addition of the daughter cart to the mother cart, the mother cart is coupled with the daughter cart for movement as a unit; and
   an energy generation system onboard at least one of the daughter cart and the mother cart, the energy generation system including a generator configured to convert energy from the mother cart's movement into electrical energy usable to power the actuator in the daughter cart.

2. The mother daughter cart system of claim 1, wherein the actuator is configured, when powered, to selectively raise the part support's elevation.

3. The mother daughter cart system of claim 1, wherein the actuator is configured, when powered, to selectively lower the part support's elevation.

4. The mother daughter cart system of claim 1, wherein the energy generation system is onboard the daughter cart, and the generator is electrically connected to the actuator to power the actuator using the electrical energy.

5. The mother daughter cart system of claim 1, wherein the energy generation system is onboard the mother cart.

6. The mother daughter cart system of claim 5, wherein:
   the energy generation system further includes a charger electrically connected to the generator and configured to use the electrical energy to charge a rechargeable storage device connected to the charger, and
   the storage device is selectively disconnectable from the charger and connectable to the actuator in the daughter cart to power the actuator.

7. The mother daughter cart system of claim 1, wherein the generator is configured to convert a portion of kinetic energy gathered by the mother cart as a product of its movement into electrical energy usable to power the actuator in the daughter cart.

8. The mother daughter cart system of claim 1, wherein the generator is configured to convert a portion of mechanical energy represented in movement of components of the mother cart relative to the mother cart as a whole as a product of its movement into electrical energy usable to power the actuator in the daughter cart.

9. A method of operating a mother daughter cart system including a moveable mother cart and a transportable daughter cart selectively addable to the mother cart and including a part support adapted to carry one or more parts and an electrically powered actuator coupled to the part support, comprising:
   imparting movement to the mother cart;
   converting, with a generator onboard at least one of the mother cart and the daughter cart, energy from the mother cart's movement into electrical energy; and
   in the daughter cart, using the electrical energy to power the actuator to impart movement to the part support to manipulate its placement.

10. The method of claim 9, further comprising:
    using the electrical energy to power the actuator to raise the part support's elevation.

11. The method of claim 9, further comprising:
    using the electrical energy to power the actuator to lower the part support's elevation.

12. The method of claim 9, wherein the generator is onboard the mother cart, further comprising:
    charging, with a charger electrically connected to the generator, a rechargeable storage device connected to the charger using the electrical energy;
    when the storage device is charged, disconnecting the storage device from the charger;
    connecting the storage device to the actuator; and
    with the storage device connected to the actuator, powering the actuator to impart movement to the part support to manipulate its placement using the storage device.

13. The method of claim 9, wherein the generator is onboard the mother cart, further comprising:
    powering the actuator to impart movement to the part support to manipulate its placement using a rechargeable storage device connected to the actuator;
    when the storage device is discharged, disconnecting the storage device from the actuator;
    connecting the storage device to a charger electrically connected to the generator; and
    with the storage device connected to the charger, charging the storage device with the charger.

14. The method of claim 9, further comprising:
converting, with the generator, a portion of kinetic energy gathered by the mother cart as a product of its movement into electrical energy.

15. The method of claim 9, further comprising:
converting, with the generator, a portion of mechanical energy represented in movement of components of the mother cart relative to the mother cart as a whole as a product of its movement into electrical energy.

16. A mother daughter cart system, comprising:
a transportable daughter cart, the daughter cart including a storage unit suspended by an electrically powered winch configured, when powered, to selectively wind and unwind, the storage unit including at least one part support adapted to carry one or more parts, and subject to having its elevation raised when the winch is powered to wind, and lowered when the winch is powered to unwind;
a moveable mother cart to which the daughter cart is selectively addable, wherein with the addition of the daughter cart to the mother cart, the mother cart is coupled with the daughter cart for movement as a unit; and
an onboard energy generation system, the energy generation system including a generator configured to convert energy from the mother cart's movement into electrical energy usable to power the winch in the daughter cart to selectively wind and unwind.

17. The mother daughter cart system of claim 16, wherein the energy generation system is onboard the mother cart.

18. The mother daughter cart system of claim 17, wherein:
the energy generation system further includes a charger electrically connected to the generator and configured to use the electrical energy to charge a rechargeable storage device connected to the charger, and
the storage device is selectively disconnectable from the charger and connectable to the winch in the daughter cart to power the winch to selectively wind and unwind.

19. The mother daughter cart system of claim 16, wherein the mother cart includes a wheel rotated against the ground as a product of its movement, and the generator includes an electric motor driven by the rotational motion of the wheel to convert the rotational motion of the wheel into electrical energy.

20. The mother daughter cart system of claim 16, wherein the daughter cart includes a frame including an upright portion, and the winch is mounted to upright portion of the frame.

\* \* \* \* \*